United States Patent [19]
George et al.

[11] 3,986,954
[45] Oct. 19, 1976

[54] METHOD AND APPARATUS FOR CLARIFYING CONTAMINATED LIQUIDS

[75] Inventors: Albert L. George; Jerry C. Manning, both of Lafayette, La.

[73] Assignee: Al George, Inc.

[22] Filed: May 19, 1975

[21] Appl. No.: 578,424

[52] U.S. Cl.............................. 210/44; 210/195 R; 210/196; 210/221 P
[51] Int. Cl.[2].......................................... B03D 1/24
[58] Field of Search........... 209/170; 210/44, 195 S, 210/220, 221 P, 221 M, 256, 196, 195 R; 261/77

[56] References Cited
UNITED STATES PATENTS

| | | | |
|---|---|---|---|
| 2,330,589 | 9/1943 | Juell | 210/221 P X |
| 2,339,453 | 1/1944 | Bidwell | 210/195 S X |
| 2,713,026 | 7/1955 | Kelly et al. | 210/221 P |
| 2,888,139 | 5/1959 | Fischer | 210/221 P |
| 2,938,629 | 5/1960 | Hollingsworth et al. | 209/170 |
| 3,175,687 | 3/1965 | Jones | 210/221 P X |
| 3,179,252 | 4/1965 | Vrablik | 210/221 M X |
| 3,243,046 | 3/1966 | Kakumoto et al. | 210/221 P X |
| 3,435,954 | 4/1969 | Ohl et al. | 210/256 X |
| 3,623,608 | 11/1971 | Waterman | 210/221 P |
| 3,794,171 | 2/1974 | Kimura et al. | 261/77 X |

*Primary Examiner*—Charles N. Hart
*Assistant Examiner*—Robert H. Spitzer
*Attorney, Agent, or Firm*—Pravel & Wilson

[57] ABSTRACT

A method and apparatus for clarifying liquids contaminated with suspended materials that do not readily separate by gravity, is disclosed. A flowing stream of the contaminated liquid is initially passed to a mixing zone at a predetermined flow velocity and intimately mixed with a gas stream to form a multiphase liquid-contaminant-gas stream. The flow velocity of the multiphase stream is then alternately increased and decreased with substantially simultaneous decrease and increase of pressure to ultimately disperse and dissolve the gas stream throughout the liquid and contaminant phases of the stream. The multiphase stream is next dispersed into a novelty designed flotation tank means having a U-shaped quiescent vessel of increased volume flow area maintained at a reduced pressure whereby the dissolved gas is caused to break out of solution in the form of finely dispersed gravity density reducing microscopic bubbles which, along with the dispersed gas bubbles in the stream, attach to themselves and the suspended contaminants thereby increasing the specific gravity differential between the contaminants and liquid. The stream is caused to pass through the quiescent vessel at a gradually reducing flow velocity with diminishing gentle turbulence so as to allow the contaminants and liquid to separate by gravity, the contaminants forming a contaminant layer floating on the surface of the liquid. The contaminant layer is then separated from the liquid. The novel apparatus includes means for recirculating a portion of the liquid from the quiescent vessel for further treatment until a desired amount of clarification is obtained.

30 Claims, 7 Drawing Figures

METHOD AND APPARATUS FOR CLARIFYING CONTAMINATED LIQUIDS

BACKGROUND OF THE INVENTION

This invention relates to a method and apparatus for clarifying aqueous liquids containing suspended contaminants, and more particularly pertains to a method and apparatus for removing suspended contaminants from a liquid by utilizing a specific gravity modification technique for increasing the separation and efficiency of the suspended contaminants from the liquid.

In the production of petroleum, varying amounts of water are usually co-produced which may be separated from the crude petroleum by a variety of physical and/or chemical separation techniques. The separated produced water normally contains varying amounts of oil dispersed throughout in the form of extremely small microscopic oil droplets, emulsions, oil-coated solids and the like and other contaminants that are suspended in the water which do not respond favorably to conventional separation techniques, especially gravity separation. The presence of such suspended oil-type contaminants creates a pollution problem in the disposal of the waters, particularly in remote production areas, such as offshore production areas. It has now become incumbent to further treat these waters to remove as much of the suspended oil-type contaminants as is practically possible to meet stringent Federal and State regulatory environmental standards. Similar problems exist in the disposal of petroleum effluents, chemical plant effluents and like industrial effluents as well as many types of discharges from food processing industries that contain suspended animal fats, vegetable oils, organic matter and the like as contaminants or pollutants.

There are several methods known for removing residual oil contaminants from produced waters, refinery effluents, and similarly contaminated industrial effluents. For example, several filtration techniques are known which include the employment of a wide variety of filtration media such as sand, pumice, perlite, screen-type filters, and the like for removing the suspended oil particle contaminants. Several coalescing techniques are also known in which a porous media is used to enhance oil droplet growth and gravity separation. However, these filtration and coalescing methods suffer from several disadvantages including the requirements of back-washing and/or frequent removal and replacement or cleaning of coalescing or filtration media which leads to high maintenance costs and further waste disposal problems.

Several gas flotation techniques and apparatus are also known which generally include intimately mixing a suspended oil particle contaminated liquid with gas bubbles which aids the gravitational separation of the suspended oil contaminants from the liquid. Types of gas flotation systems may be generally classified as full-stream pressurization, split-stream partial pressurization, partial recycle pressurization and multicell impeller-eductor systems.

In full-stream pressurization systems a pressurized contaminated water stream is exposed to pressurized gas under relatively quiescent conditions, dissolving a small amount of the gas into the water stream. This pressurized gas-contaminated water stream is then injected into a flotation tank where the gas is flashed out of solution in the form of bubbles which float the suspended oil contaminants to the water surface in the tank. The flotation tank usually includes a device for removing the floating oil contaminants from the surface of water. These systems are usually once-through systems, i.e., the contaminated waters are treated only once.

Split-stream partial pressurization and partial recycle systems are substantially similar to the full-stream pressurization systems except that the latter systems normally include mixing only a portion of the contaminated water with gas or mixing a portion of the effluent from the flotation tank with gas. In such systems, a main stream of oil-contaminated water is injected into a flotation tank in close proximity with the partial pressurized water-gas stream for intimate admixture with the gas bubbles formed.

Impeller-educator systems usually include educting a gas stream into multiple flotation cells in close proximity to an impeller which imparts shear to the water to create a dispersion of gas bubbles. An oil-contaminated waste water stream in such systems is injected into the flotation cells in close proximity to the impeller and educted gas bubbles.

For a more detailed description of the above-mentioned gas flotation systems, see M. M. Ellis et al., "Clarifying Oilfield and Refinery Waste Waters by Gas Flotation," *Journal of Petroleum Technology*, (Apr., 1973), 426–430.

However, gas flotation systems presently available leave much to be desired in clarifying many types of suspended oil-contaminated waters and similar contaminated liquid effluents. Known systems usually require the use of multiple flotation cells to successfully clarify these waters sufficiently to meet regulatory environmental standards. Multiple flotation cells or tanks require excessive space and excessive load support that make them uneconomical and impractical in many areas where their use is required such as remote petroleum production areas and offshore production platforms. In addition, multiple flotation cells require the utilization of multiple power units for their operation which increases maintenance and power costs.

We have invented a new and improved method and apparatus for removing suspended contaminants from liquids such as petroleum production waters, refinery effluents, chemical plant effluents, food processing plant waste waters, and the like, without creating additional disposal problems and the use of multiple flotation cells or tanks. The invention is based upon a novel application of a gas flotation technique and includes a novelty designed compact single flotation cell apparatus which enables the contaminated liquid to be treated repeatedly, thus providing multiple performance. The inventive apparatus requires only a relatively small amount of space, power and maintenance and is particularly useful in remote production areas such as offshore productions areas.

SUMMARY OF THE INVENTION

The present invention relates to a new and improved method and apparatus for clarifying aqueous liquids containing suspended contaminants which do not readily respond to gravitational separation, such as petroluem production waste waters, refinery waste waters, chemical plant effluents, food processing plant discharges, and the like by altering and increasing the specific gravity differential between the aqueous liquid and the suspended contaminants. The method of the invention comprises forming a flowing stream of aqueous liquid containing the suspended contaminants and passing the flowing stream into a gas-liquid mixing zone under pressure at a desired flow velocity. A stream of gas is also passed into the gas-liquid mixing zone to intimately disperse and dissolve the gas stream into the liquid phase and suspended contaminant phase to form a multiphase gas-contaminant-liquid stream. The flow velocity of the multiphase stream is increased along with a substantially simultaneous decrease in pressure to finely disperse the gas throughout the liquid and suspended contaminant phases of the stream. The flow velocity is then decreased with substantially simultaneous increase in pressure to further finely disperse and intimately dissolve the gas stream throughout the water phase and contaminant phase of the stream. The abrupt alternate fluctuation of stream flow velocity and pressure results in a highly homogeneous multiphase mixture of the liquid, contaminants and gas. The pressurized multiphase liquid-contaminant-gas mixture stream is next passed into a zone having an increased volume flow area which is maintained at a reduced pressure relative to the stream to cause the dissolved gas to break out of solution and along with the dispersed gas form finely dispersed gravity-density reducing microscopic bubbles which attach to themselves and to the suspended contaminants to increase the specific gravity differential between the contaminants and liquid. The contaminants are thus caused to separate and float with the minute gas bubbles to the surface of the liquid. The flowing stream is passed through the zone of increased volume flow area at a gradually diminishing reduced flow velocity so as to allow the formation and separation of a contaminant layer floating on the surface of the liquid. The floating contaminant layer is then separated from the liquid.

The apparatus of the invention comprises a pump means for transporting a flowing stream of aqueous contaminated liquid under pressure at a desired flow velocity, means communicating with the pump means for intimately dispersing and dissolving a gas stream into the pressurized flowing stream of contaminated liquid to form a multiphase liquid-contaminant-gas mixture and means for causing repeated abrupt alternate fluctuations in the flow velocity and pressure of the flowing multiphase stream for intimately dispersing and dissolving the gas stream throughout the liquid and contaminant phases of the flowing stream. The apparatus further includes a flotation tank means having a quiescent vessel of increased volume flow area which is maintained at a reduced pressure in relation to the pressurized multiphase flowing stream for receiving the pressurized multiphase stream and means mounted within one end of the flotation tank means for passing the pressurized multiphase flowing stream to the flotation tank means and for evenly diffusing and distributing the multiphase stream across the quiescent vessel width whereby the dissolved gas in the multiphase flowing stream is caused to break out of solution to form finely dispersed gravity-density microscopic bubbles which, along with the finely dispersed gas, attach to themselves and the suspended contaminants and rise to the liquid surface. The increased flow area of the quiescent vessel allows the flowing stream to pass at a diminishing reduced flow velocity with diminishing gentle rolling turbulence allowing the contaminants to separate and float to the liquid surface to form a contaminant layer. The apparatus further includes means for separating the floating contaminant layer from the liquid in the flotation tank means.

DESCRIPTION OF THE PREFERRED EMBODIMENTS

Figure 1:
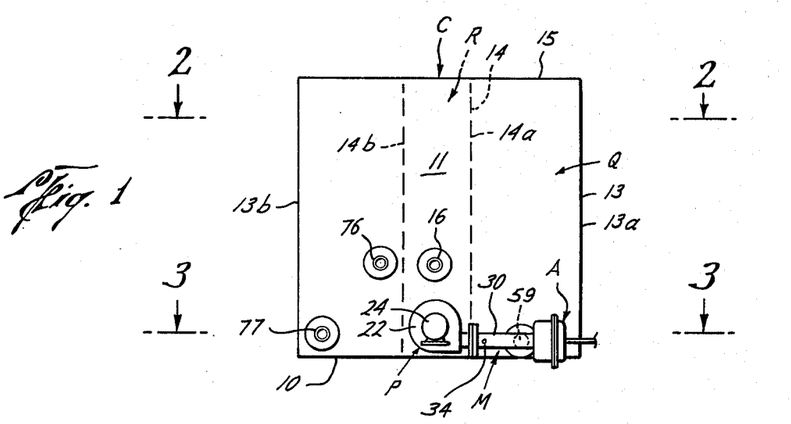
FIG. 1 is a front elevational view of a preferred embodiment of the invention.
Figure 2:
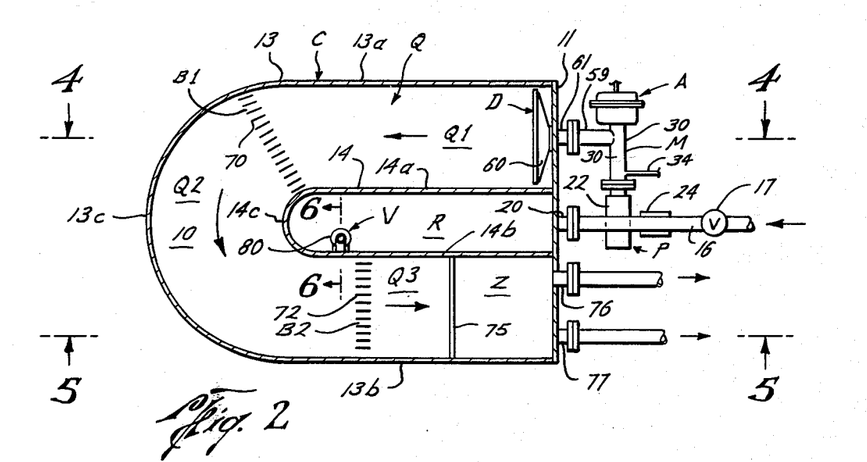
FIG. 2 is a top view, partially in cross section taken along line 2—2 of FIG. 1 which illustrates in detail the single flotation cell of a preferred embodiment of the invention.

Referring to FIGS. 1 and 2 of the drawings, the apparatus of the invention includes a single flotation cell, generally C, of novel design which is comprised of a U-shaped quiescent vessel Q and a inlet and recirculation chamber R. More particularly, the flotation cell C includes a bottom wall 10, a front end wall 11 perpendicularly attached along its bottom edge thereto and a U-shaped outer wall 13 having a pair of substantially parallel arm portions 13a, 13b and a curved base portion 13c perpendicularly mounted with the bottom wall 10. The outer wall 13 is also perpendicularly mounted with the front end wall 11 at the respective ends of the substantially parallel arm portions 13a, 13b. The single flotaton cell C further includes a U-shaped inner wall 14 perpendicularly mounted with the bottom wall 10 which is within and is substantially surrounded by the U-shaped outer wall 13. The U-shaped inner wall 14 has a pair of substantially parallel arm portions 14a, 14b and a curved base portion 14c and is also perpendicularly mounted with the front end wall 11 at the respective ends of the arm portions 14a, 14b.

As shown in FIG. 2, the arm portions 13a, 14a and 13b, 14b of the respective outer wall 13 and inner wall 14 are substantially parallel and are spaced substantially equal distances from each other, respectively. However, the curved portions 13c and 14c of the respective outer wall 13 and inner wall 14 have a greater predetermined space therebetween than the spaces between the arm portions 13a and 14a and 13b and 14b to provide a greater volume flow area as will be more particularly explained hereafter. The respective walls 13, 14 and front end wall 11 thus cooperate to form the U-shaped quiescent vessel Q and the inlet and recirculation chamber R which is disposed between and is substantially surrounded by the quiescent vessel Q.

The single flotation cell C also includes an upper wall 15 perpendicularly mounted with the respective upper edges of the front end wall 11, U-shaped outer wall 13 and U-shaped inner wall 14. The upper wall 15 may be releasably mounted with the respective walls to provide easy access to the U-shaped quiescent vessel Q and the inlet and recirculation chamber R if desirable.

Referring now to FIG. 2, an aqueous liquid containing suspended contaminants which do not respond favorably to gravity separation is caused to flow from a suitable storage source into the inlet and recirculation chamber R through an inlet pipe 16 which extends through the front end wall 11 of the flotation cell C and communicates with the surge and recirculation chamber R. Preferably, a valve 17 is provided with the inlet pipe 16 to control the volume of contaminated liquid that is charged to the inlet and recirculation chamber R for reasons more particularly explained hereafter.

Figure 3:
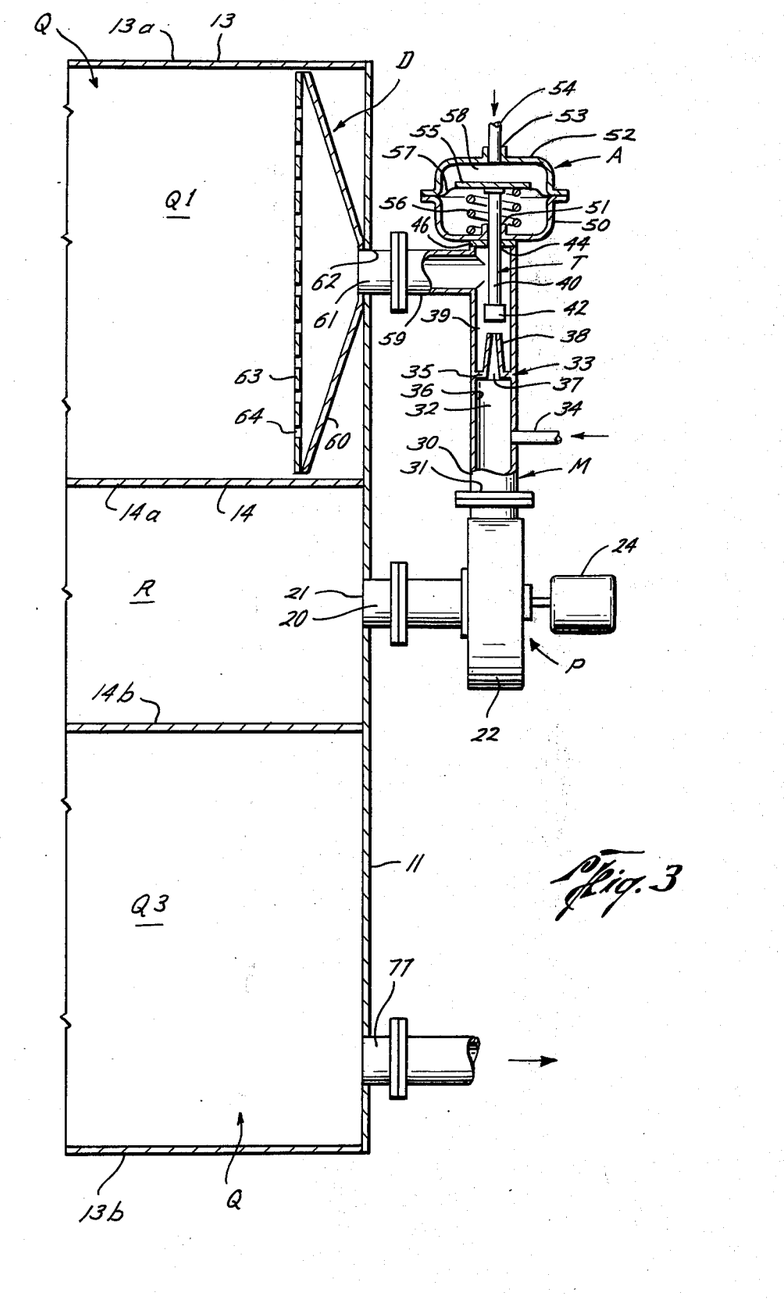
FIG. 3 is a top view, partially schematic and partially in section, taken along line 3—3 of FIG. 1 which illustrates in detail certain means of a preferred embodiment of the invention for forming a multiphase liquid-contaminant-gas flowing stream.

Referring now to FIG. 3 of the drawings, a first preferred embodiment of the invention includes a transporting pipe 20 communicating with the inlet and recirculation chamber R through an opening 21 in the front wall 11 which is detachably mounted by means of bolts or the like (not shown) with a pump means, P, for transporting a flowing stream of contaminated liquid from the inlet and recirculation chamber R under pressure at a desired flow velocity. The pump means P includes any type of conventionally designed pump 22 which is capable of forming and transporting the contaminated liquid as a flowing stream at a desired pressure and flow velocity which is driven by any conventional power source, such as a variable speed electric motor 24.

The pump means P is detachably mounted by means of bolts or the like (not shown) with a means, M, for intimately mixing and dissolving a gas stream into a suspended contaminant phase and liquid phase of the pressurized liquid flowing stream to form a flowing homogenous multiphase liquid-contaminant-gas mixture stream. This mixing means, M, includes a hollow cylindrical tube 30 connected at one end 31 with the pump means P which defines a gas-liquid mixing chamber 32 having a predetermined volume flow area, a means 33 for causing repeated abrupt alternate fluctuations in the flow velocity and pressure of the flowing stream disposed within the hollow cylindrical tube 30 and a means for passing a gas stream into the gas-liquid mixing chamber 32 which communicates therewith through a gas stream inlet pipe 34. In the embodiment of the invention illustrated in FIG. 3, a pressurized gas stream may be injected from a suitable means such as a compressor (not shown) through the gas stream inlet pipe 34 into the gas-liquid mixing chamber 32 under a pressure in excess of the pressure of the flowing stream of contaminated liquid transported therethrough by the pump means P. Injection of a pressurized gas stream combined with stream turbulence and shearing intimately disperses and dissolves the gas phase throughout the liquid and contaminant phases to form a multiphase gas-contaminant-liquid mixture stream.

As shown in FIG. 3, in one preferred embodiment of the invention the means 33 for causing repeated abrupt alternate fluctuations in the flow velocity and pressure of the flowing stream is disposed in the hollow cylindrical tube 30 across the gas-liquid mixing chamber 32 downstream to the gas stream inlet pipe 34. This means 33 includes a nozzle 35 transversely mounted with the interior wall 36 of the hollow cylindrical tube 30 which has an orifice 37 disposed substantially along the longitudinal axis of the cylindrical tube 30. The orifice has a diameter smaller than the diameter of the hollow cylindrical tube 30.

Figure 7:
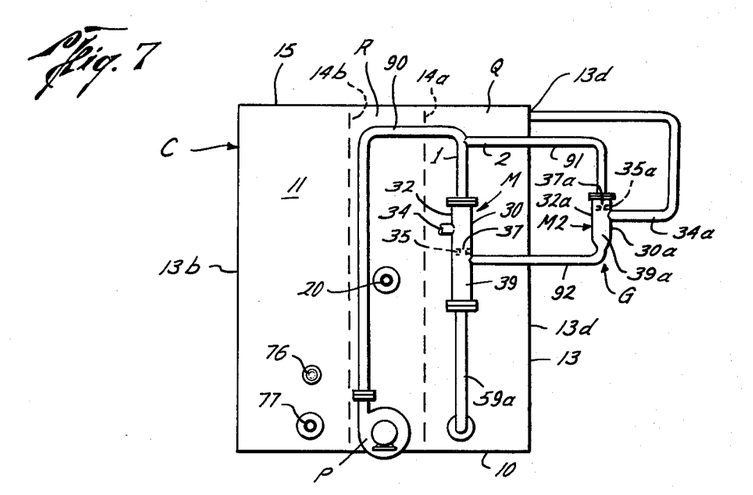
FIG. 7 is a front elevational view partially in cross section of a second preferred embodiment of the invention which illustrates in detail certain means for recirculating gas from the flotation cell for forming a multiphase liquid-contaminant-gas flowing stream.

The nozzle 35 may be of any conventional type provided the orifice 37 has a size smaller than the diameter of the hollow cylindrical tube 30. For example, the nozzle 35 may be a typical venturi type, as shown in FIG. 3, having a barrel 38 facing downstream substantially about the hollow cylindrical tube 30 cylindrical axis, or of the conventional disc-type, as shown in FIG. 7. Furthermore, a variable size orifice-type nozzle which includes means for adjusting the orifice size (not shown) may be employed if desirable.

The nozzle 35 may be fixedly attached to the inner wall 36 of the hollow cylindrical tube 30 or may be releasably mounted therewith by appropriate means (not shown) to allow the nozzle 35 to be removed therefrom and replaced with a nozzle having a different orifice size or shape. The orifice 37 may be of any desired shape but is preferably substantially circular having a diameter less than the diameter of the cylindrical tube 30.

As more particularly described hereafter, the pressurized multiphase liquid-contaminant-gas stream is passed at a desired flow velocity through the orifice 37 whereby the flow velocity of the stream is greatly increased by the reduced volume flow and restricted flow area through the orifice 37. Substantially simultaneously the pressure of the flowing stream is decreased through the orifice 37 and adjacent the downstream side of the nozzle 35. The flowing stream then passes to the downstream portion 39 of the gas-liquid mixing chamber 32 which has an increased volume flow area as compared to the nozzle orifice 37 whereby the flow velocity of the stream is caused to decrease with substantially simultaneous increase in pressure.

The gas-liquid mixing means M is also preferably provided with a means T for throttling the flow of the multiphase liquid-contaminant gas mixture stream through the nozzle orifice 37, which is disposed at the downstream end of the hollow cylindrical tube 30 and extends along its longitudinal axis in the downstream portion 39 of the gas-liquid mixing chamber 32. The throttle means T includes a shaft 40 aligned along the longitudinal axis of the cylindrical tube 30 which has a cylindrical disc 42 mounted at one end on spaced relationship downstream from the nozzle 35 in axial alignment with the orifice 37. The cylindrical disc 42 has a diameter which is greater than the diameter of the nozzle orifice 37 yet is smaller than the diameter of the hollow cylindrical tube 30. The shaft 40 extends longitudinally through the gas-liquid mixing chamber downstream portion 39 and outward from the interior of the tube 30 through a packed opening 44 of an end plate 46 mounted to the end of the cylindrical tube downstream end. An actuator means A is mounted with the outward end of the shaft 40 for longitudinal reciprocal movement of the shaft 40 and disc 42 so as to adjust the space between the cylindrical disc 42 and the nozzle orifice 37. Reciprocal longitudinal movement of the shaft 40 and cylindrical disc 42 provides a throttling function of the flow velocity of the multiphase stream passing through the nozzle orifice 37.

Any type of device capable of longitudinally moving the shaft 40 and disc 42 may be employed as the actuator means A. An actuator device which may be operated pneumatically or hydraulically is preferred. As illustrated in FIG. 3, such a device may include a lower housing 50 mounted adjacent the hollow tube end plate 46 which has an opening 51 axially aligned with the end plate packed opening 44 through which the shaft 40 extends. An upper housing 52 which has an opening 53 is attached to the lower housing 50. A pressurized fluid line 54 is connected to the upper housing 52 through the opening 53. A disc 55 is perpendicularly attached to the outward end of the shaft 40 in the interior of the upper and lower housings, 50, 52. A spring 56 is mounted between the perpendicular disc 55 and the lower housing 50 about the shaft 40. The disc 55 has a diaphragm 57 attached to its outer peripheral edge, which is also attached to the lower and upper housings 50, 52. The diaphragm 57, disc 55 and upper housing 52 provide a pressure chamber 58 which communicates with the fluid pressure line 54.

In operation, injection of a pressurized fluid, such as a pressurized gas stream or hydraulic fluid stream through the line 54 into the pressure chamber 58 depresses the disc 55 and longitudinally moves the shaft 40 and disc 42 along the axis of the hollow tube 30. The spring 56 is simultaneously depressed and the space between the disc 42 and the nozzle 35 is reduced thereby reducing the flow area resulting in an increase in flow velocity through the restricted are with substantially simultaneous decrease in pressure in the restricted area. Removal of pressurized fluid from the pressure chamber 58 allows the depressed spring 56 to longitudinally move the shaft 40 in the opposite direction thereby increasing the space between the cylindrical disc 42 and the nozzle 35, with concurrent decrease in stream flow velocity and increase in stream pressure in the restricted area.

As shown in FIG. 3, a conduit 59 is transversely attached at one end to the hollow cylindrical tube 30 near the end plate 46 which communicates with the gas-liquid mixing chamber downstream portion 39. The conduit 59 is removably attached, such as bolts or the like (not shown), at its opposite end with a means, D, for passing and diffusing the pressurized multiphase liquid-gas-contaminant flowing stream into the U-shaped quiescent vessel Q.

Figure 4:
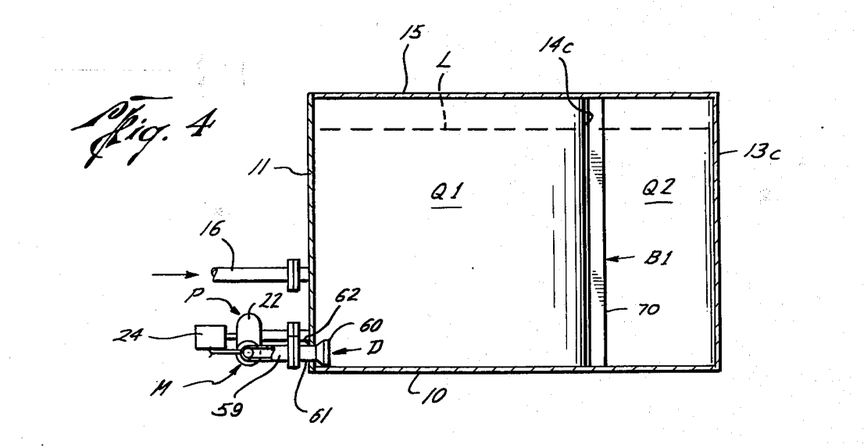
FIG. 4 is a cross sectional side view taken along line 4—4 of FIG. 2 which illustrates certain details of the flotation cell of a preferred embodiment of the invention.

Referring now to FIG. 4, the diffuser means, D, is disposed in the interior of the U-shaped quiescent vessel Q adjacent one end at predetermined distances from the flotation cell bottom wall 10 and front end wall 11 near its bottom. The diffuser means D preferably includes an outwardly extending flow directing spreader plate 60 connected with a conduit 61 which extends through an opening 62 in the flotation cell end wall 11 and is removably mounted with conduit 59. The spreader plate 60 extends outwardly from the front end wall 11 a predetermined distance and has a width slightly less than the width of the quiescent vessel Q adjacent the front end wall 11. The spreader plate 60 is thus disposed to evenly diffuse and distribute the pressurized multiphase flowing stream across the entire width of the quiescent vessel Q as it is caused to pass therethrough. If desirable, the spreader plate 60 may include an end plate 63 (FIG. 3) connected with its outer end which has a plurality of orifices 64 or a plurality of outwardly extending fanned spreader plates (not shown), through which the multiphase pressurized stream may be passed and distributed into the quiescent vessel Q.

Referring now to FIG. 2 of the drawings, the U-shaped quiescent vessel Q provides a primary quiescent chamber Q1 which has the diffuser means D mounted adjacent one end, a curved secondary quiescent chamber Q2 communicating with the opposite end of the primary quiescent chamber Q1, and a final quiescent chamber Q3 communicating with the opposing end of the curved secondary quiescent chamber Q2. The primary quiescent chamber Q1 and final quiescent chamber Q3 are aligned in substantial parallel relationship with each other and have substantially equal width and length. The curved secondary quiescent chamber Q2 is curved approximately 180° and has a width greater than the width of the primary and secondary quiescent chambers Q1 and Q3. The primary, secondary and final quiescent chambers Q1, Q2 and Q3, respectively, have increased volume capacity to provide a predetermined increased flow area so as to reduce the flow velocity of the multiphase liquid stream as it is caused to flow through from the diffuser means D. The primary, secondary and final quiescent chambers Q1, Q2 and Q3 are also maintained at reduced pressure by any conventional means, such as by having an opening in the quiescent vessel upper wall 15 (FIG. 1) for communication with the atmosphere or with an appropriate pressure controlling device (both not shown).

The quiescent vessel Q also includes a pair of means B1 and B2 positioned at predetermined points across its entire width for altering the directional flow of the separating contaminated liquid stream as it passes therethrough. As shown, the first directional flow altering means B1 is disposed substantially between the primary quiescent chamber Q1 and the curved secondary quiescent chamber Q2 and includes a plurality of vertical fins 70, each perpendicularly connected at one end with the flotation cell bottom wall 10 and at the respective end with a horizontal support member (not shown) which extends across the width of the quiescent vessel Q and is in turn mounted at its respective ends with the outer U-shaped wall 13 and inner U-shaped wall 14. The plurality of vertical fins 70 are angled a predetermined amount so as to alter the directional flow of the separating liquid stream passing from the primary quiescent chamber Q1 to the curved secondary quiescent chamber Q2, as shown by the arrows in FIG. 2 and thereby prevent the flowing stream from hitting the outer wall curved base portion 13c and returning to the primary quiescent chamber Q1. The second directional flow altering means B2 is disposed at a predetermined position in the final quiescent chamber Q3 substantially adjacent to the curved secondary quiescent chamber Q2 and similarly includes a plurality of vertical fins 72 perpendicularly connected with the flotation cell bottom wall 10 at their respective lower ends and connected with a horizontal support member (not shown) at their respective upper ends. The horizontal support member also extends across the width of the quiescent vessel Q and is mounted at its respective ends to the outer wall 13 and inner wall 14. The vertical fins 72 are substantially parallel to each other and to the outer and inner walls 13, 14 so as to alter the directional flow of the separating liquid stream passing from the curved secondary quiescent chamber Q2 straight forward through the final quiescent chamber Q3, as shown by the arrows in FIG. 2, and thereby prevent any portion of the stream from swirling, vortexing, etc. and returning to the secondary quiescent chamber Q2.

Figure 5:
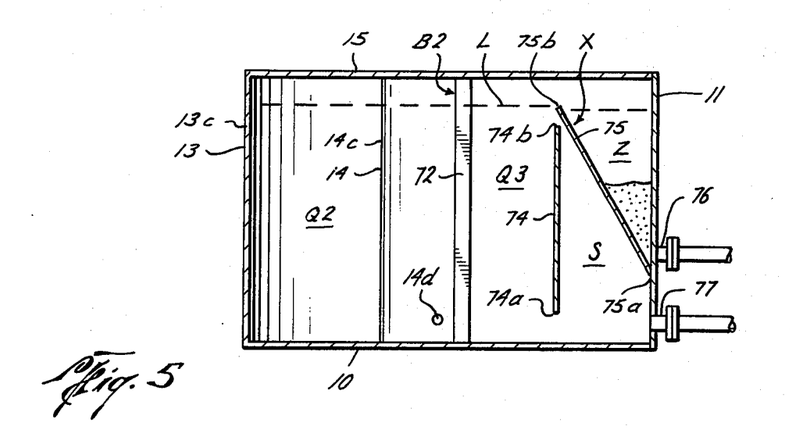
FIG. 5 is a cross sectional side view taken along line 5—5 of FIG. 2 which illustrates other certain details of the flotation cell including means for separating a contaminant layer separated from and floating on the surface of the liquid of the stream in the flotation cell.

Referring now to FIG. 5 of the drawings, the quiescent vessel Q further includes a vertical plate 74 disposed in the final quiescent chamber Q3 a predetermined distance from the quiescent vessel end wall 11 which extends across the entire width of the final quiescent chamber Q3 and is mounted at its respective side edges with the outer wall 13 and inner wall 14 to provide a settling chamber S. The vertical plate 74 has a bottom edge 74a positioned a predetermined distance from the bottom wall 10 to provide an opening for communication between the primary portion of the final quiescent chamber Q3 with the settling chamber S. The vertical plate 74 also has an upper edge 74b positioned a predetermined distance from the upper vessel wall 15, the purpose of which will become readily apparent hereafter.

In addition, as shown in FIG. 5 of the drawings, a means, X, for separating the contaminant layer floating on the surface of the liquid is provided in the final quiescent chamber Q3. This separating means X includes an overflow weir 75 which is disposed at the upper end of the final quiescent chamber Q3 and is mounted at its lower end 75a with the end wall 11. The overflow weir 75 extends across the width of the quiescent vessel Q to provide a contaminant collecting chamber Z. The overflow weir 75 also has an upper end 75b which is positioned a predetermined distance above the vertical plate upper edge 74b to provide a predetermined space therebetween so as to allow contaminant separating and floating to the surface in the settling chamber S to escape therethrough and pass over the overflow weir 75. An outlet pipe 76 communicates with the contaminant collecting chamber Z substantially at its bottom and extends through the front end wall 11. The outlet pipe 76 can be valve-controlled (not shown) if desirable.

As shown in FIG. 5, when the liquid level of the separating contaminant and liquid flowing stream reaches a certain level, L, in the final quiescent chamber Q3 a portion of the contaminant layer floating on the surface of the liquid utilizing the impetus of the flowing stream is decanted over the top of the overflow weir 75 into the oil collecting chamber Z. The collected contaminants can then be removed as desired from the oil collecting chamber Z through the outlet pipe 76. Concurrently, a portion of the flowing stream is caused to pass under the vertical plate 74 into the settling chamber S wherein the flow velocity of the separating contaminant and liquid substantially ceases and is held for a desired period of time to allow the most minute contaminant particles to separate and float to the liquid surface between the vertical plate upper edge 74b and overflow weir upper edge 75b and be decanted into the contaminate collection chamber Z. A clarified liquid outlet pipe 77 communicating with the settling chamber S and extending through the quiescent vessel front end wall 11 is disposed substantially adjacent the bottom of the settling chamber S for removal of the clarified liquid from the quiescent vessel Q. Preferably, the clarified liquid outlet pipe 77 is valve-controlled (not shown) to allow the clarified liquid to be removed when desired at a desirable volume flow rate.

It will be readily apparent to those skilled in the art that the liquid level in the quiescent vessel Q and contaminant level in the contaminant collecting chamber Z may be controlled by several well-known means, such as the employment of an adjustable weir and/or float-controlled dump valves. In fact, it is preferred to utilize float-controlled dump valves (not shown) in the preferred embodiments of the invention.

Figure 6:
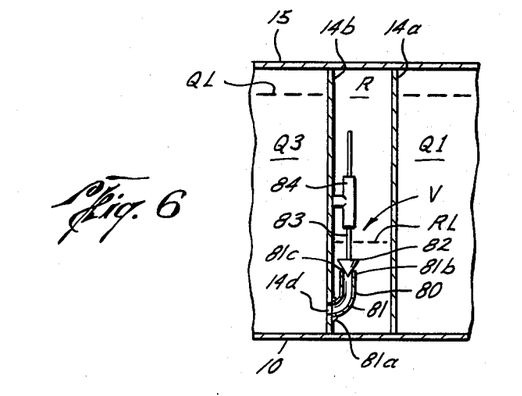
FIG. 6 is a cross sectional view taken along line 6—6 of FIG. 2 which illustrates in detail certain means for recirculating the liquid in the flotation cell for further treatment.

The apparatus of the invention is also provided with a novel means, V, for recirculating at least a portion of the separating liquid stream flowing in the quiescent vessel Q so as to allow the liquid to be retreated until a desired amount of contaminant separation and/or clarification is obtained. As shown in FIGS. 2 and 6, the recirculating means V is disposed in the inlet and recirculation chamber R and includes a differential-type recirculation valve 80 which communicates with the quiescent vessel Q through an opening 14d in the U-shaped inner wall 14 separating the inlet and recirculating chamber R and the quiescent vessel Q. The recirculating means V is disposed so as to communicate with the quiescent vessel Q through the inner wall opening 14d at a predetermined point near its bottom in the upstream end of the final quiescent chamber Q3 (FIGS. 2 and 6).

More particularly, as shown in detail in FIG. 6, the differential type recirculation valve 80 includes a curved valve conduit 81 communicating at one end 81a through the inner wall opening 14d with the final quiescent chamber Q3 and having its opposite end 81b opening vertically upwardly communicating with the inlet and recirculating chamber R. The curved valve conduit 81 has an annular valve seat 81c mounted with its upward end 81b. The differential valve 80 further includes a weighted conical-shaped valve gate 82 having a diameter in excess of the diameter of the curved valve conduit 81, and a vertical shaft 83 attached to the top of the weighted conicle valve gate 82. The vertical shaft member 83 extends vertically through a guide member 84 which is attached by means of bolts or the like (not shown) to the U-shaped inner wall 14. The weighted conicle valve gate 82 and vertical shaft 83 are adapted for reciprocal vertical movement and are thus held in alignment by the guide member 84. Further, the weighted conicle valve gate 82 is adapted for sealing engagement with the annular seal 81c of the curved valve conduit 81. The combined weight of the conicle shaped gate 82 and vertical shaft 83 is calibrated to a predetermined amount so as to maintain a desired pre-set liquid level height differential between the quiescent vessel Q and the inlet and recirculation chamber R. When the liquid level in the inlet and recirculation chamber R drops below a desired pre-set level RL or the liquid level in the quiescent vessel Q rises above the desired pre-set level QL (FIG. 6) the greater weight of liquid in the quiescent vessel Q causes the weighted conicle gate 82 to rise above the annular valve seat 81c, thus allowing a gravitational influx of liquid from the quiescent vessel Q through the curved valve conduit 81 into the inlet and recirculation chamber R. Thus, by adjusting the liquid levels in the quiescent vessel Q and inlet and recirculation chamber R, such as by the continuous transfer of the contaminated liquid from the inlet and recirculation chamber R by the pump means P at a flow rate exceeding the inlet rate of the contaminated liquid through the inlet pipe 16, the separating liquid may be continuously recirculated from the quiescent vessel Q at any desired proportion for repeated treatment.

In carrying out the method of this invention in the operation of the first preferred embodiment illustrated in FIGS. 1–6, the contaminated liquid containing suspended contaminants which do not respond to gravity separation is passed from a source such as a suitable storage tank (not shown) through the valve-controlled inlet pipe 16 to the inlet and the recirculating chamber R of the single flotation cell C. The contaminated liquid is transported as a flowing stream from the inlet and recirculating chamber R through the conduit 20 to the gas-liquid mixing chamber 32 of he gas-liquid mixing means M at a desired volume flow rate and flow velocity under pressure by means of the pump means P. Preferably, the contaminated liquid is transported to the gas-liquid mixing chamber 32 at a volume flow rate which is greater than the volume flow rate of the contaminated liquid passing from a suitable source into the inlet and recirculation chamber R so that the liquid level in the inlet and recirculating chamber drops below a predetermined level RL to cause the differential-type recirculating valve 80 to open providing liquid recirculating from the U-shaped quiescent vessel Q.

A stream of pressurized gas is injected into the gas-liquid mixing chamber 32 through the gas stream inlet pipe 34 communicating therewith at a pressure in excess of the contaminated liquid stream pressure to intimately disperse and dissolve the pressurized gas stream into the water phase and suspended contaminant phase of the contaminated liquid stream. The injection of the pressurized gas stream and shearing of the contaminated liquid flowing stream causes intimate contacting of the gas with the contaminants thereby forming a flowing multiphase contaminant-liquid-gas mixture stream.

Any type of non-condensable gas may be employed for the gas stream. Examples of preferred gases include air, methane, combustion gases, natural gas, and the like. It is particularly preferred to employ a gas which contains no oxygen or other active elements or materials, such as methane or natural gas. Moreover, any conventional gas injecting device may be employed to inject the gas stream into the contaminated liquid stream.

The multiphase flowing stream is next passed through the orifice 37 of the nozzle 35 into the downstream portion 39 of the mixing chamber 32. Due to the restricted flow area through the nozzle orifice 37 in comparison with that of the downstream portion 39, the passing of the flowing stream therethrough causes an abrupt alternate increase and decrease in the stream flow velocity. Substantially simultaneously, an abrupt alternate decrease and increase of the pressure within the stream occurs. Specifically, the abrupt decrease of pressure within the stream is observed as the flowing stream is passed through the orifice 37 and adjacent the downstream side of the nozzle 35 within the downstream portion 39. As the flowing stream is passed through the downstream portion 39 the pressure within the stream abruptly increases as the flow velocity decreases due to the increased flow area. The rapid alternate pressure decrease and increase cause a portion of the gas phase of the flowing stream to alternately break out of solution at points of decreased pressure and redissolve intimately throughout the liquid and contaminant phases at points of increased pressure. In addition, the abrupt alternate increase and decrease in stream flow velocity along with the substantially simultaneous decrease and increase in stream pressure causes extreme turbulence and cavitation throughout the stream which produces a highly dispersed multitude of minute gas bubbles which intimately contact, adhere and absorb to the suspended contaminants in the flow stream. These conditions result in the formation of a highly homogeneous multiphase gas-contaminant liquid flowing stream with the gas phase intimately dispersed and dissolved throughout the contaminant and liquid phases.

As mentioned hereinbefore, the flow velocity of the admixed gas-contaminated liquid flowing stream passed through the nozzle 35 may be controlled to any desired level by operation of the throttle means T which adjusts the space between the cylindrical disc 42 and the downstream side of the nozzle 35. The operation of the throttle means T thus similarly adjusts the flow stream velocity downstream of the nozzle 35 in the downstream portion 39 of the mixing chamber 32. Thus, by operation of the throttle means T, the abrupt alternate increase and decrease of the stream flow velocity with substantially simultaneous pressure decrease and increase may be controlled as desired to obtain any desired level of dispersion and dissolution of the gas stream into substantially any type of contaminated liquid.

The pressurized homogeneous multiphase flowing stream is then passed through the conduit 59 and the diffuser means D into the U-shaped quiescent vessel Q which provides a zone having an increased volume flow area and is maintained at a reduced pressure in relation to the stream pressure. The spreader plate 60 of the diffuser means, disposed adjacent the bottom of the primary quiescent chamber Q1 of the quiscent vessel Q evenly distributes the flowing stream across its width whereby a gradually diminishing gentle rolling turbulence commences within the stream (FIG. 4). As the flowing stream is distributed in the primary quiescent chamber Q1, the multitude of intimately dispersed gas bubbles, along with absorbed and attached contaminants rise rapidly to the surface and form a contaminant layer on the surface of the liquid phase. Simultaneously, due to the reduced pressure maintained in the quiescent vessel Q, the portion of the gas phase that was dissolved in the contaminant and liquid phases of the stream begins to break or flash out of solution in the form of highly dispersed minute bubbles which attach to themselves and to the suspended contaminants and float to the surface. The attachment and absorption of the multitude of minute dispersed and dissolved gas bubbles to the suspended contaminants increase the specific gravity differential between the contaminants and the liquid thereby providing enhanced separation and formation of the contaminant layer floating on the surface of the liquid.

The separating flowing stream is caused to pass through the primary quiescent chamber Q1 through the curved quiescent chamber Q2 and into the final quiescent chamber Q3 at a continuously diminishing flow velocity with gradually diminishing gentle rolling turbulence allowing the dissolved gas to continuously flash or break out of solution and form additional minute gas bubbles which attach to themselves and to the remaining suspended contaminants and rise to the contaminant layer floating on the liquid surface. Additional reduction in flow velocity occurs in the separating flowing stream due to the continuous flashing off and loss of the gas phase of the multiphase stream causing a reduced volume displacement of the liquid phase.

As mentioned hereinbefore, the directional flow of the separating waste water stream passing from the primary quiescent chamber Q1 into the curved secondary quiescent chamber Q2 is altered by the plurality of vertical fins 70, which prevent a portion of the stream from hitting the vessel outer wall base portion 13c and returning to the primary quiescent chamber Q1 (FIG. 2). Similarly, the directional flow of the separating waste water stream from the curved quiescent chamber Q2 to the final quiescent chamber Q3 is controlled by the vertical fins 72 which prevent channeling and return of any portion of the stream to the second curved quiescent chamber Q2.

As shown in FIG. 5 of the drawings, a portion of the separating liquid in the final quiescent chamber is caused to pass between the bottom edge 74a of the transfer plate 74 and the vessel bottom wall 10 into the settling chamber S disposed at the downstream end of the quiescent chamber Q3. Turbulence in the liquid passed to the settling chamber S is practically negligible, thus enabling any suspended contaminants in the liquid which have relatively small differences in specific gravity relative to the liquid to gradually separate therefrom and rise to the liquid surface between the vertical plate upper edge 74b and overflow weir 75 and be collected with the contaminant layer.

The contaminant layer is separated from the surface of the liquid by causing it to pass over the overflow weir 75 into the contaminant collection chamber z, each respectively disposed in the end of the final quiescent chamber Q3, when the liquid in the quiescent vessel Q reaches a certain level L. The gradually diminishing flow velocity of the separating stream provides additional impetus to push the contaminant layer over the overflow weir 75. The separated contaminant collected in the collection chamber Z may then be removed from the quiescent vessel Q as desired through the valve-controlled outlet pipe 76. Similarly, the clarified liquid may be removed from the settling chamber S through the valve-controlled outlet pipe 77 as desired. Both of the outlet pipes 76, 77 may be controlled automatically by placement of float sensors (not shown) in the final quiescent chamber Q3 and contaminant collection chamber Z in accordance with known techniques. Preferably, the clarified liquid is removed from the settling chamber S of the quiescent vessel Q through the outlet pipe 77 at substantially the same flow rate the untreated contaminated liquid is passed through the inlet pipe 16 into the inlet and recirculation chamber R.

In a preferred embodiment of the method of the invention, at least a portion of the liquid of the separating flowing stream caused to pass through the quiescent vessel Q, is recirculated from the quiescent vessel Q and is passed to the gas-liquid mixing chamber 32 under pressure by means of the pump means P for retreatment. By recirculation, the method and apparatus of the invention may be employed to clarify substantially any type of contaminated liquid, particularly production water brines containing suspended oil particles, oil-coated solids and like contaminants, to any desired degree of clarity to meet the stringent federal and stage regulations without the use of multiple flotation cell units heretofore required by known methods and apparatus. The method and apparatus of the invention is thus particularly adapted for use in remote production areas, particularly offshore which require minimum space and weight requirements and minimum maintenance.

The recirculation step is carried out in the operation of the apparatus of the invention by altering the pre-set liquid level height differential between the liquid level QL in the quiescent vessel Q and the liquid level RL in the inlet and recirculation chamber R (FIG. 6) which causes the weighted conicle disc 82 and vertical shaft 83 to rise from the annular valve seat 81c thus allowing an influx of liquid from the quiescent vessel Q through the valve conduit 81 into the inlet and recirculation chamber R, as more particularly described hereinbefore. The preset liquid level height differential between the quiescent vessel liquid level QL and the inlet and recirculation chamber liquid level RL may be altered in a variety of ways such as by altering the inlet flow rate of the untreated contaminated liquid through the inlet pipe 16, altering the outlet flow rate of the clarified liquid from the quiescent vessel Q through the outlet pipe 77, and/or altering the operational speed of the pump means P in accordance with conventional techniques. Preferably, the pump means P is operated at a desired speed to transport liquid from the inlet and recirculation chamber R at an increased volume flow rate compared to the flow rate of the untreated contaminated liquid charged to the inlet and recirculation chamber R and the outlet flow rate of the clarified water from the quiescent vessel Q. By such operation, the liquid in the quiescent vessel Q is recirculated at a desired multiple of the injection flow rate of the untreated contaminated liquid. However, it will be understood that the recirculation rate may be adjusted as desired to provide the desired amount of liquid clarification.

If desirable, a chemical composition capable of aiding the separation of the suspended contaminants from the liquid may be admixed with the contaminated liquid. Any type of chemical compound capable of aiding the clarification of the liquid may be employed in the process of the invention. These chemical compositions or mixtures are well-known and include oil-water demulsifying agents, coagulating agents, flocculating agents, foaming agents and the like. These agents employed are normally cationic or anionic and include, by way of example, polyoxylated amines, alcohols and fatty acids, and organic sulphates, sulphonates and amines, to name a few.

Preferably, the chemical compound capable of aiding the clarification of the contaminated liquid is admixed therewith prior to passing the contaminated liquid under pressure into the gas-liquid mixing means M. The particular type and amount of chemical compound admixed with the contaminated liquid is dependent upon the particular type of liquid being treated and is best determined emperically. By way of example, a sample of the contaminated liquid to be treated may be analyzed prior to treatment to determine the type and amount of chemical compound to be employed.

Reference is now made to FIG. 7 of the drawings, which illustrates in detail a second preferred embodiment of the invention. This second preferred embodiment of the invention includes the single flotation cell C, pump means P, mixing means M, diffusing means D, etc. described hereinabove. However, in this second preferred embodiment, the mixing means M is preferably disposed in a vertical arrangement relative to the flotation cell C and spaced a predetermined distance therefrom and communicates with the pump means P by means of a partially U-shaped pipe 90 which is also disposed in a vertical arrangement and positioned a predetermined distance from the flotation cell front end wall 11. Accordingly, the conduit 59a attached at one end to the hollow cylindrical tube 30 of the mixing means M is L-shaped and extends vertically downward for connection with the diffuser means D (not shown).

This second preferred embodiment further includes a means, G, for circulating a gas from the quiescent vessel Q of the flotation cell C to the gas-liquid mixing means M for intimate admixture with the contaminated liquid flowing stream passing therethrough. This gas circulation means G allows a gas stream to be continuously reused for treatment of a contaminated liquid stream thereby greatly reducing the gas requirements for carrying out the method of the invention and thereby greatly reducing the costs of operation, particularly where noncondensable gases such as methane, flue gases, etc. are employed.

More particularly, as illustrated in FIG. 7, the gas circulating means G includes a second gas-liquid mixing means M2 for mixing and dissolving a gas stream into a suspended contaminant phase and liquid phase of the pressurized liquid flowing stream to form a flowing homogeneous multiphase liquid-contaminant-gas mixture stream which communicates with the partially U-shaped pipe 90 by means of an L-shaped pipe 91. The second mixing means M2 is substantially similar to the first mixing means M and thus includes a cylindrical hollow tube 30a connected at its upper end with the L-shaped pipe 91 which defines a gas-liquid mixing chamber 32a having a predetermined volume flow area and a downstream portion 39a and a nozzle member 35a mounted therein having an orifice 37a, all as described hereinabove. The second gas-liquid means M2 further includes a gas stream inlet pipe 34a which communicates at one end with the gas-liquid mixing chamber 32a in its downstream portion 39a at a predetermined point adjacent to the downstream side of the nozzle member 35a. The gas inlet pipe 34a communicates at its opposite end with the upper portion of the quiescent vessel Q and extends through an opening 13d in the vessel outer wall 13. A conduit 92 is provided for connecting the second mixing means M2 with the first mixing means M. The pipe 92 is transversely connected with the second mixing means hollow tube 30a at its downstream end and communicates at its opposite end with the downstream portion 39 of the gas-liquid mixing chamber 32 of the first mixing means M at a point adjacent to the downstream side of the nozzle 30.

In carrying out the method of the invention in the operation of this second preferred embodiment, the contaminated liquid is transported as a pressurized flowing stream from the inlet and recirculating chamber R through the partially U-shaped conduit 90 by means of the pump means P at a desired volume flow rate and flow velocity. The pressurized contaminated liquid flowing stream is split into a primary flowing stream 1 and a secondary flowing stream 2 at the juncture of the L-shaped pipe 91 with the partially U-shaped pipe 90. The primary flowing stream 1 is thus caused to pass to the first gas-liquid means M into the mixing chamber 32 where it is intimately admixed with a stream of pressurized gas injected through the gas inlet pipe 34 and passed through the orifice 37 of the nozzle 35, all as described hereinbefore.

The secondary pressurized flowing stream 2 of contaminated liquid is caused to pass through the L-shaped pipe 91 to the second gas-liquid means M2 into its mixing chamber 32a. This secondary flowing stream 2 is then forced through the orifice 37a of the nozzle 35a. As the secondary flowing stream 2 passes through the orifice 37a, the flow velocity greatly increases along with a substantially simultaneous decrease in stream pressure, mentioned hereinbefore. Further, as the flowing stream is passed into the lower portion 39a of the mixing chamber 32a this decrease in pressure is maintained adjacent to the downstream side of the nozzle 35a substantially at the point where the conduit 92 communicates with the mixing chamber 32. In accordance with known principles the pressure adjacent the downstream side of the nozzle 35a is sufficiently low to create a vacuum thereby drawing gas present in the upper portion of the quiescent vessel Q through the gas pipe 34a into the mixing chamber 32a for admixture with the secondary liquid flowing stream 2.

Similarly, as the primary flowing stream is caused to pass throught the orifice 37 of the nozzle 35 of the first mixing means M, a partial vacuum is created at the point where the conduit 92 communicates with the downstream portion 39 of the gas-liquid mixing chamber 32. The combination of this partial vacuum along with the pressure of the secondary flowing stream 2 causes the secondary flowing stream to be passed from the second mixing means M-2 into the downstream portion 39 of the first mixing chamber 32 via the conduit 92.

As mentioned hereinbefore, due to the increased volume flow area of the downstream portion 39 of the first mixing chamber 32, the flow velocities of the combined flowing streams are decreased thereby substantially simultaneously increasing the stream pressure which causes high shearing of the stream to intimately disperse and dissolve the gas throughout the liquid and contaminant phases thereby forming a highly homogeneous gas-contaminant-liquid multi-phase flowing stream. This multiphase flowing stream is then passed via conduit 59a through the diffuser means D into the U-shaped quiescent vessel Q whereby the dissolved gas breaks out of solution in the form of minute bubbles which, along with the dispersed gas attach to the suspended contaminants and float to the surface, all as described hereinbefore. The remaining steps of the method are also identical to those described hereinbefore inasmuch as the flotation cell C of the second embodiment is identical to that of the first embodiment. Therefore, the remaining steps of the operation of this second embodiment will not be further described.

However, in this second embodiment of the invention, the gas floating to the surface of the liquid flowing stream in the quiescent chamber Q may be recirculated continuously for reuse through the gas transfer pipe 34-A. Preferably, a layer of gas is maintained above the liquid in the quiescent chamber Q at a pressure slightly above atmosphere such as by injecting a gas through an opening in the quiescent chamber top wall 15 through an appropriate conduit (not shown). By injecting gas into the quiescent chamber Q injection of gas through the gas inlet pipe 34 into the first gas-liquid mixing chamber 32 may be completely eliminated, if it is desirable. In any event, in carrying out the method of the invention in the operation of this second preferred embodiment (FIG. 7), the amount of gas utilized is greatly reduced in comparison with the amount required in operating conventional gas flotation apparatus.

The novel method and apparatus of the invention may be employed to effectively clarify substantially any type of liquid contaminated with suspended contaminants capable of separation where the specific gravity differential may be increased. The inventive method and apparatus is particularly effective for removing suspended oil particles, oil coated solids and like contaminants from contaminated waters such as production brines. It has been found that the method and apparatus of the invention can remove such suspended oil contaminants from production brines to a level as low as ten parts per million.

The foregoing disclosure and description of the invention are illustrative and explanatory thereof, and various changes in the size, shape, and materials as well as in the details of the illustrated construction may be made without departing from the spirit and scope of the invention.

We claim:

1. An apparatus for clarifying aqueous liquids containing suspended contaminants comprising:
   a pump means for forming and transporting a flowing stream of aqueous liquid containing suspended contaminants under pressure at a desired flow volume;
   means communicating with said pump means for intimately mixing a gas stream into said pressurized flowing stream of contaminated liquid for dispersing and dissolving the gas stream into a water phase and suspended contaminant phase of the pressurized stream;
   means mounted within said mixing means for abruptly altering the stream flow velocity and stream pressure to intimately disperse and dissolve the gas stream throughout the liquid and contaminant phases and to provide intimate contact of said gas within said contaminant phase to form a multiphase gas-contaminant-liquid flowing stream;
   vessel means for receiving the pressurized multiphase flowing stream from said gas-liquid mixing means, said vessel means having increased volume flow area relative to said gas-liquid mixing means and comprising a primary quiescent chamber, a curved secondary quiescent chamber having an increased volume flow area relative to said primary quiescent chamber and communicating at one end therewith, and a final quiescent chamber communicating with the curved secondary quiescent chamber at an end opposite said primary quiescent chamber, said vessel means quiescent chambers respectively forming a curved continuous flow path adapted to provide continuously diminishing flow velocity with continuously diminishing turbulence with the multiphase flowing stream being received and passed therethrough to allow the formation of a contaminant layer floating on the surface of a contaminant-free liquid effluent and to prevent admixing of the multiphase contaminated liquid and resulting contaminant-free liquid effluent produced;
   means mounted within one end of said vessel means primary quiescent chamber and communicating with said gas-liquid mixing means for passing and diffusing said pressurized multiphase stream into said primary quiescent chamber whereby the dissolved gas in the multiphase stream breaks out of solution to form finely dispersed gravity density reducing microscopic bubbles which along with the intimately dispersed minute gas bubbles attach to themselves and to the suspended contaminants to increase the specific gravity differential between said contaminants and liquid whereby the suspended contaminants separate from the liquid and float to the liquid surface to form said contaminant layer floating on the surface of said liquid in said vessel means;
   means mounted within said vessel means final quiescent chamber for separating the contaminant layer floating on the surface of said liquid; and
   outlet means communicating with said vessel means final quiescent chamber for removing said resulting contaminant-free liquid therefrom.

2. The apparatus of claim 1 wherein said means for intimately mixing the gas stream into the pressurized contaminated liquid stream includes
   a cylindrical hollow tube communicating at one end with said pump means and communicating at its opposite end with said means for passing and diffusing said pressurized multiphase stream into said vessel means, said cylindrical hollow tube providing a gas-liquid mixing chamber; and
   said cylindrical tube having said means for abruptly altering the flowing stream flow velocity and stream pressure mounted thereto within said gas-liquid mixing chamber.

3. The apparatus of claim 2, wherein the means for abruptly altering the flowing stream flow velocity and stream pressure includes
   a nozzle member mounted with said cylindrical hollow tube in the gas-liquid mixing chamber thereof a predetermined distance from the hollow tube end communicating with said pump means, said nozzle having an orifice of predetermined size and shape.

4. The apparatus of claim 3 wherein said means for intimately mixing the gas stream into the contaminated liquid pressurized stream further includes
   means mounted with one end of said hollow cylindrical tube and disposed within said gas-liquid mixing chamber for adjusting the flow velocity of the flowing stream passed through the means for abruptly altering the flowing stream flow velocity and stream pressure.

5. The apparatus of claim 4 wherein the means for adjusting the flow velocity of the flowing stream includes
   a longitudinal adjustable shaft member disposed axially within the gas-liquid mixing chamber provided by said hollow cylindrical tube, said shaft extending outward of said tube through one end thereof;
   a cylindrical disc mounted at one end of said shaft end member and disposed in spaced relationship adjacent said means for abruptly altering the flowing stream flow velocity and stream pressure, said disc having a diameter smaller than the diameter of the hollow cylindrical tube; and
   means mounted with an opposite outward end of said shaft for reciprocally moving said shaft along the axis of said cylindrical tube for adjusting the space between said disc and said means for abruptly altering the flowing stream flow velocity and stream pressure.

6. The apparatus of claim 1 including
   means for recirculating liquid from the vessel means to said pump means.

7. The apparatus of claim 6 wherein the liquid recirculating means is disposed to communicate with said vessel means at a predetermined point near an upstream end of said final quiescent chamber communicating with said curved secondary quiescent chamber.

8. The apparatus of claim 7 wherein said means for recirculating the liquid from the vessel means includes valve means communicating with the vessel means final quiescent chamber for removing a portion of the liquid of the separating multiphase gas-liquid-contaminant flowing stream from said vessel means; and and inlet and recirculation chamber means communicating with said valve means for receiving said recirculated liquid and for receiving untreated contaminated liquid, said inlet and recirculating chamber means also communicating with the pump means and being mounted between said vessel means primary, curved secondary and final quiescent chambers.

9. The apparatus of claim 1 wherein the means for separating the contaminant layer floating on the surface of the liquid in said vessel means includes
means for decanting the contaminant layer floating on the surface of the liquid.

10. The apparatus of claim 1 including
means for communicating with said vessel means and said gas-liquid mixing means for recirculating gas from said vessel means for admixture with said contaminated liquid flowing stream.

11. The apparatus of claim 10 wherein said means for recirculating gas from said vessel means includes
a second means for mixing a gas stream into said contaminated liquid flowing stream, and second means having one end communicating with said pump means and an opposite end communicating with said first gas-liquid mixing means;
means mounted within said second gas-liquid mixing means for abruptly altering the flowing stream flow velocity and stream pressure; and
means for transporting gas from said vessel means to said second gas-liquid mixing means, said transporting means having one end communicating with said vessel means and an opposite end communicating with said second gas liquid mixing means at a predetermined point substantially adjacent to a downstream side of said means for abruptly altering the flowing stream flow velocity and stream pressure.

12. The apparatus of claim 11 wherein said second gas-liquid mixing means communicates with said first gas-liquid mixing means by means of a fluid transporting member having one end mounted with said second gas-liquid mixing means and an opposite end mounted with said first gas-liquid mixing means and communicating with said first gas-liquid mixing chamber thereof at a predetermined point substantially adjacent to a downstream side of said means for abruptly altering the flowing stream flow velocity and stream pressure.

13. The apparatus of claim 11 including
means having one end mounted with said pump means for splitting the contaminated liquid presurized flowing stream into a primary flowing stream and a secondary flowing stream, said means having a first portion mounted with said first gas-liquid means for passing the primary flowing stream thereto and a second portion mounted with said second gas-liquid means for passing the secondary flowing stream thereto.

14. The apparatus of claim 1 including a flotation cell comprising
a bottom wall; a U-shaped outer wall vertically mounted with the bottom wall, said U-shaped outer wall having a curved base portion and a pair of substantially parallel arm portions; a U-shaped inner wall vertically mounted with said bottom wall, said inner wall having a curved base portion and a pair of substantially parallel arm portions, said U-shaped inner wall being disposed substantially within said U-shaped outer wall, whereby said pair of inner wall arm portions are disposed substantially parallel to at substantially equal predetermined distances from said pair of U-shaped outer wall arm portions and said inner wall curved base portion is disposed a predetermined distance from said outer wall curved base portion greater than the predetermined distance between said pair of inner wall arm portions and said pair of outer wall arm portions; a front end wall member vertically mounted with said base wall and mounted with respective ends of said U-shaped outer wall member and said U-shaped inner wall member; and a top wall member removably mounted with the front end wall member, said U-shaped outer wall member and said U-shaped inner wall member, said wall members respectively forming said vessel means with a U-shape including said primary, curved secondary and final quiescent chambers with said primary and final quiescent chambers respectively being substantially parallel and of equal width, and an inlet and recirculation chamber disposed between said quiescent chambers.

15. The apparatus of claim 14 wherein the U-shaped vessel means includes
means for altering the directional flow of the multiphase stream received in the primary quiescent chamber, said means being disposed across the width of the vessel means between said primary quiescent chamber and said curved secondary quiescent chamber;
a second means for altering the directional flow of the multiphase stream passing from the secondary quiescent chamber to the final quiescent chamber, said means being disposed across the width of the vessel means at a predetermined point within the final quiescent chamber.

16. The apparatus of claim 14 wherein said means for separating the contaminant layer floating on the surface of the liquid is disposed at one end of said final quiescent chamber.

17. The apparatus of claim 16 including
a vertical plate disposed across the width of said final quiescent chamber and being positioned a predetermined distance from said end wall and said means for separating the oil contaminant layer, said vertical plate having a bottom edge spaced a predetermined distance from the vessel bottom wall to provide a final settling chamber whereby liquid passing thereto is maintained with minimum turbulence to allow any contaminants remaining suspended in the liquid to separate and float to the liquid surface; and
wherein said outlet means is mounted with said end wall substantially adjacent said bottom wall and communicating with said final settling chamber.

18. A process for clarifying an aqueous liquid containing suspended contaminants comprising the steps of;
forming a flowing stream of an aqueous liquid containing suspended contaminants;
passing the contaminated liquid flowing stream into a gas-liquid mixing zone under pressure at a given flow velocity;

passing a stream of a gas into the gas-liquid mixing zone;

altering the flow velocities and the pressures of the contaminated liquid stream and gas stream in said gas-liquid liquid mixing zone to intimately disperse and dissolve the gas stream into a liquid phase and a suspended contaminant phase of the contaminated liquid stream and form a pressurized multiphase gas-contaminant-liquid flowing stream;

passing the pressurized flowing multiphase stream into a zone having increased volume flow area and maintained at a reduced pressure relative to the gas-liquid mixing zone, said zone including a primary quiescent zone communicating with the gas-liquid mixing zone, a curved secondary quiescent zone communicating with said primary quiescent zone and having an increased volume flow area relative thereto and a final quiescent zone communicating at an opposite end with the curved secondary quiescent zone, to cause the dissolved gas to break out of solution to create turbulence in the stream in the primary quiescent zone and, along with the dispersed gas, to form finely dispersed gravity density reducing microscopic bubbles which attach to themselves and to the suspended contaminants to increase the specific gravity differential between said contaminants and said liquid whereby said contaminants are caused to separate and float to the surface of the liquid;

passing the flowing multiphase stream successively through said quiescent zones whereby the flowing stream is caused to flow therethrough at a continuously diminishing flow velocity with continuously diminishing gentle turbulence to allow the formation of a contaminant layer floating on the surface of the liquid; and separating the contaminant layer from the surface of the liquid in the final quiescent zone.

19. The method of claim 18 wherein at least a portion of the liquid is recirculated from the zone having increased volume flow area and is passed under pressure as a flowing stream to said gas-liquid mixing zone.

20. The method of claim 19 wherein said liquid is recirculated from the final quiescent zone of said zone having increased volume flow area from a predetermined point near an upstream end of said final quiescent zone communicating with the curved secondary quiescent zone.

21. The method of claim 20 wherein said liquid is recirculated and passed to said gas-liquid mixing zone at a desired multiple volume of the volume of the contaminated aqueous liquid stream passed to said gas-liquid mixing zone.

22. The method of claim 18 wherein the gas stream is passed to the gas-liquid mixing zone and mixed with the aqueous liquid stream prior to altering the flow velocity and the pressure of the streams.

23. The method of claim 18 wherein the gas stream is passed into said gas-liquid mixing zone at a pressure in excess of the pressure of the contaminated aqueous liquid flowing stream.

24. The method of claim 18 wherein at least a portion of the gas formed as microscopic bubbles which float to the surface of the flowing stream in the zone having increased volume flow area is circulated from said zone to the gas-liquid mixing zone.

25. The method of claim 24 wherein said gas circulated from said zone is passed to the gas-liquid mixing zone and mixed with the aqueous liquid stream subsequent to altering the flow velocity and the pressure of the aqueous liquid stream.

26. The method of claim 18 wherein the contaminant layer is separated by decanting said contaminant layer floating on the surface of said liquid.

27. The method of claim 18 wherein at least a portion of the liquid of the flowing stream in the zone having increased volume flow area is recirculated therefrom and passed under pressure at a desired flow velocity to said gas-liquid mixing zone continuously until a desired amount of separation of the contaminants of the flowing stream in the increased volume flow area zone is obtained.

28. The method of claim 18 wherein a chemical compound capable of aiding the clarification of the aqueous liquid containing suspended contaminants is admixed with the contaminated liquid stream prior to passing it under pressure at a given flow velocity into said gas-liquid mixing zone.

29. The method of claim 18 wherein the aqueous liquid containing suspended contaminants is an aqueous liquid containing suspended oil particles and oil-coated solids contaminants incapable of separation by gravity.

30. The method of claim 29 wherein the gas passed as a stream to the gas-liquid mixing zone is a non-condensable gas selected from methane, natural gas or mixtures thereof.

* * * * *